United States Patent
Bari et al.

(10) Patent No.: US 7,881,748 B2
(45) Date of Patent: *Feb. 1, 2011

(54) NETWORK IDENTITY AND TIMEZONE (NITZ) FUNCTIONALITY FOR NON-3GPP DEVICES

(75) Inventors: Farooq Bari, Bothell, WA (US); Thomas W. Bonner, Smyrna, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/644,811

(22) Filed: Dec. 22, 2009

(65) Prior Publication Data

US 2010/0099455 A1    Apr. 22, 2010

Related U.S. Application Data

(63) Continuation of application No. 11/462,549, filed on Aug. 4, 2006, now Pat. No. 7,664,527.

(51) Int. Cl.
*H04M 1/00* (2006.01)
*H04M 1/38* (2006.01)

(52) U.S. Cl. ............. 455/553.1; 455/552.1; 455/556.1; 455/550.1

(58) Field of Classification Search ............ 455/552.1, 455/553.1, 425, 566, 524, 550.1, 556.1
See application file for complete search history.

(56) References Cited

U.S. PATENT DOCUMENTS

| | | | | |
|---|---|---|---|---|
| 5,151,932 A * | 9/1992 | Arizumi et al. | ........ | 379/106.06 |
| 5,212,810 A * | 5/1993 | Maeda et al. | ........ | 455/528 |
| 5,309,500 A * | 5/1994 | Koma et al. | ........ | 455/566 |
| 5,528,558 A * | 6/1996 | Mardhekar et al. | ........ | 368/10 |
| 5,818,920 A * | 10/1998 | Rignell et al. | ........ | 379/211.02 |
| 5,832,367 A * | 11/1998 | Bamburak et al. | ........ | 455/62 |
| 5,903,849 A | 5/1999 | Selin et al. | | |
| 5,920,824 A * | 7/1999 | Beatty et al. | ........ | 455/425 |
| 5,952,922 A | 9/1999 | Shober | | |
| 6,023,610 A | 2/2000 | Wood, Jr. | | |
| 6,075,992 A * | 6/2000 | Moon et al. | ........ | 455/455 |
| 6,181,938 B1 | 1/2001 | Salmela et al. | | |
| 6,278,883 B1 | 8/2001 | Choi | | |
| 6,282,431 B1 | 8/2001 | Konno | | |
| 6,567,344 B1 * | 5/2003 | Auer | ........ | 368/21 |
| 6,728,533 B2 * | 4/2004 | Ishii | ........ | 455/425 |

(Continued)

FOREIGN PATENT DOCUMENTS

WO    2008019297 A2    2/2008

OTHER PUBLICATIONS

OA dated Mar. 18, 2009 for U.S. Appl. No. 11/462,549, 16 pages.

(Continued)

*Primary Examiner*—Tilahun Gesesse

(57) ABSTRACT

A system that provisions a multimode mobile or converged device with local time information and network provider identification when the multimode mobile device is operating within the purview of a wireless local area network (WLAN). The system includes components that receive protocol data and that extract network provider identification from the received protocol data as well as utilizing the received protocol data to ascertain the local time.

20 Claims, 11 Drawing Sheets

U.S. PATENT DOCUMENTS

| | | | |
|---|---|---|---|
| 6,728,553 B1* | 4/2004 | Lehmus et al. | 455/558 |
| 6,870,822 B2* | 3/2005 | Balogh | 370/332 |
| 6,985,744 B2* | 1/2006 | Katagishi et al. | 455/456.1 |
| 7,031,747 B2 | 4/2006 | Cyr et al. | |
| 7,069,055 B1* | 6/2006 | Lee | 455/566 |
| 7,136,673 B2 | 11/2006 | Yukie et al. | |
| 7,245,924 B2* | 7/2007 | Katagishi et al. | 455/456.1 |
| 7,359,288 B2* | 4/2008 | Auer | 368/21 |
| 7,394,726 B2* | 7/2008 | O'Neill et al. | 368/21 |
| 7,406,105 B2 | 7/2008 | DelMain et al. | |
| 7,680,485 B2* | 3/2010 | Takada | 455/411 |
| 7,711,855 B2* | 5/2010 | Thind et al. | 709/246 |
| 2001/0016479 A1 | 8/2001 | Wood, Jr. | |
| 2008/0032738 A1 | 2/2008 | Boyer et al. | |

OTHER PUBLICATIONS

Third Generation Partnership Project; Technical Specification Group Services and System Aspects; 3GPP System to Wireless Local Area Network (WLAN) interworking System Description (Release 7) Technical Specification 23.234 (2006) 88 pages.

Third Generation Partnership Project; Technical Specification Group Services and System Aspects; IP Multimedia Subsystem (IMS) Stage 2 (Release 7) Technical Specification 23.228 (2006) 197 pages.

Third Generation Partnership Project; Technical Specification Group Core Network and Terminals; Mobile Radio Interface Layer 3 Specification; Core Network Protocals; Stage 3 (Release 7) Technical Specification 24.008 (2006) 534 pages.

http://www.faqs.org/rfcs/rlc868.html last viewed Nov. 2, 2006, 3 pages.

http://www.rfc.net/rfc1305.html last viewed Nov. 2, 2006, 108 pages.

http://www.rfc.net/rfc2132.html last viewed Nov. 2, 2006, 27 pages.

http://www.rfc.net/rfc3261.htm last viewed Nov. 2, 2006, 210pages.

International Search Report & Written Opinion for PCT Patent Application No. PCT/US07/75126 dated Sep. 9, 2008, pp. 11.

OA dated Sep. 23, 2008 for U.S. Appl. No. 11/462,549, 13 pages.

OA dated Jun. 12, 2009 for U.S. Appl. No. 11/625,549, 15 pages.

Lear, et al. "A Timezone Option for DHCP draft-lear-dhc-timezone-option-02.txt" http://tools.ietf.org/wg/dhc/draft-lear-dhc-timezone-option-02.txt last viewed Nov. 28, 2006, 10 pages.

* cited by examiner

NETWORK IDENTITY AND TIMEZONE (NITZ) FUNCTIONALITY FOR NON-3GPP DEVICES

CROSS-REFERENCE TO RELATED APPLICATIONS

This application is a continuation of U.S. patent application Ser. No. 11/462,549 entitled "NETWORK IDENTITY AND TIMEZONE (NITZ) FUNCTIONALITY FOR NON-3GPP DEVICES" filed Aug. 4, 2006, the entirety of which is incorporated by reference herein.

BACKGROUND

The mobile telephone industry has been associated with tremendous growth over the last several years. For instance, in the recent past, mobile telephones were only available to those of highest economic status due to service costs and costs associated with mobile phones. Moreover, network coverage was not extensive enough to enable robust service. In particular, only areas associated with dense population were provided with extensive wireless network coverage. Still further, the mobile phones that could utilize the networks to communicate were quite bulky, causing portation of the phone over any significant distance to be difficult at best. In more detail, antennas associated with these phones could be over a foot in length, thus making it difficult to utilize the phones in automobiles or other congested areas.

In contrast, today's portable phones (and other portable devices) can be utilized as full-service computing machines. For example, many of the most recent and advanced mobile phones can be associated with word processing software, accounting software, and various other types of software. Furthermore, network coverage has expanded to cover millions, if not billions, of users. Additionally, mobile phones have decreased in both size and cost. Specifically, modern mobile phones are often small enough to slip into an individual's pocket without discomforting the individual. Furthermore, many mobile network service providers offer phones at extremely low cost to customers who contract for service with such providers.

Advances in technology relating to mobile devices in general, and mobile phones in particular, continue to occur. For example, recently mobile telephones have been designed to communicate over disparate networks and/or between licensed and unlicensed spectra. In more detail, a multimode handset can connect to a cellular network to effectuate communications between a user of the mobile phone and another phone device, and can further connect via WiFi, Bluetooth, and the like and thereafter utilize the Voice over Internet Protocol (VoIP) (or other suitable protocol) to effectuate communication between users. Use of VoIP is often desirable to users as it is associated with less cost than employing a cellular network. In fact, some users may consider phone calls made over VoIP (or other IP-based network) completely free, despite the fact that they pay for Internet service.

Implementation of this multimode service is due at least in part to the Third Generation Partnership Project (3GPP), which have created specifications that define a mechanism that provides signal integrity for session initial protocol (SIP) signals between an IP multimedia subsystem (IMS) and user equipment (UE) (e.g., a mobile phone, a personal digital assistant, . . . ). This integrity prevents identity spoofing, man-in-the-middle attacks, and the like. The IMS represents a 3GPP and 3GPP2 effort to define an all-IP-based wireless network as a replacement for the various voice, data, signaling, and control network elements currently in existence. Furthermore, the IMS enables support for IP multimedia applications within the Universal Mobile Telecommunications System (UMTS). The UMTS is a 3G broadband packet-based transmission of text, digitized voice, video, and multimedia that offers a consistent set of services to mobile computer and phone users regardless of their physical location.

The telecom industry is currently shifting towards all IP-systems, thereby rendering multimode service handsets an important tool (as they are compatible with existing cellular systems and emerging IP-systems). This shift is driven by desires to reduce costs and create new streams of revenue while protecting an operator business model. IMS is a new service domain that facilitates this shift by enabling convergence of data, speech, and network technology over an IP-based infrastructure. For users, IMS-based services enable transmittal and receipt of various data at significantly reduced cost, including voice, text, pictures, video, and/or any combination thereof in a highly personalized and secure manner. In summary, IMS is designed to bridge the gap between existing, traditional telecommunications technology and Internet technology that increased bandwidth does not provide.

As stated above, these emerging IP-based technologies have created demand for multimode services, and thus for multimode handsets. Using this technology, users can employ one of the many wireless technologies supported by the handset to effectuate voice calls, transmission of data, and the like. For example, if one of the wireless technologies supported by the multimode handset is WLAN a user can connect to a LAN by way of WLAN. Upon such connection, users can employ services offered by their service provider.

Currently, when a GSM and/or 3GPP handset operates within a GSM and/or 3GPP network the handset is typically provisioned with appropriate network identity, local time, and time zone information. Such information permits users of such handsets to adapt their usage of these devices appropriately. For example, today many subscriber usage plans apply different usage rates depending upon the time of day that a user initiates usage of their handset. For instance, it is not uncommon for a subscriber usage plan to provide deeply discounted usage rates, or at best free coverage, during weekends and between 9 pm and 6 am on week nights, and much more expensive coverage during business hours (e.g., 9 am-5 pm, Monday to Friday). Thus, users of such handsets, by viewing the time information displayed on the display, can desist from initiating usage of their handheld devices and/or timeshift their usage to more financially propitious time periods. Similarly, many wireless service providers have arrangements or understandings with one another to allow one service provider's subscribers utilize another service provider's network. This, so called roaming functionality, albeit for additional fees typically bourne by the subscriber, extends service connectivity beyond that of the home location where the service is registered, and occurs when a subscriber of one wireless service provider utilizes the facilities of another wireless service provider. Thus, for example, in order to obviate the payment of the additional fees that can be associated with the roaming functionality, a user of a handset can upon ascertaining that the network identity displayed on the display associated with the handset desist from initiating usage until such time that he/she re-enters the established purview of his/her home location. GSM utilizes GSM specific mechanisms to provide such network identity and time information and therefore such functionality, though extant in GSM and/or 3GPP networks, has hitherto not been available in non- 3GPP networks, leading to situations where when users of multimode devices transition between GSM and/or 3GPP networks and non-3GPP networks, the network identity and time zone information has at best been incorrectly displayed.

SUMMARY

The following presents a simplified summary in order to provide a basic understanding of some aspects of the claimed subject matter. This summary is not an extensive overview, and it is not intended to identify key/critical elements of the claimed subject matter or to delineate the scope thereof. Its sole purpose is to present some concepts in a simplified form as a prelude to the more detailed description that is presented later.

The claimed subject matter relates to providing a multimode portable and/or converged device with network identity, time zone information and local time independent of access technology (e.g., irrespective of whether the network service provider is employing a GSM network, a 3GPP network, a WLAN network, and the like). GSM networks (or networks adhering to the 3GPP standards and protocols) typically provision capable devices with network identity, time zone, and local time information. However, the same is not necessarily the case with regard to many non-3GPP network environments, and in fact, in many non-3GPP network environments the capability to display the network provider name and local time information cannot be generated for display on multimode devices. Thus for example, when a multimode mobile device transitions from a GSM network and/or a 3GPP environment to a non-3GPP network, such as a WLAN environment, the multimode portable device can lose the capability of updating the network identity and the local time accordingly. For instance, where a multimode mobile device has been operating within a GSM network the local time and the network provider name is conveniently displayed on the multimode device. Thus, should a multimode device operating in a GSM network environment in one time zone transition to a different time zone and commence operation in a wireless local area network (WLAN) for example, the network identity and the local time will not be updated to reflect the current reality—the display in effect will show information that is not reflective of the fact that the mobile device now inhabits a different time zone and is now being provisioned by a different network provider. Similarly, when a multimode portable device is powered up and utilized entirely in a non-3GPP network environment, the time zone, local time and network identity may never be generated and/or displayed.

The claimed subject matter rectifies the aforementioned shortcomings with respect to providing the correct local time, time zone information and network identity information for display on multimode portable devices. The claimed subject matter can facilitate its aims by utilizing one or more extant configuration protocols, such as Session Initiation Protocol (SIP), Network Time Protocol (NTP), Dynamic Host Configuration Protocol (DHCP), and the like, to provide the necessary time zone or location information necessary to determine the local time to display. Additionally, the subject matter as claimed can for example, employ a network identifier, such as the service set identifier (SSID) employed in a wireless LAN or its equivalent for the wireless technology in use (e.g., PLMNID, BSSID, ESSID, etc.), that can be broadcast by all wireless access points to determine the network operator's identity. In this manner, the local time and the network provider's identity can be displayed on an interface associated with the multimode mobile device.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
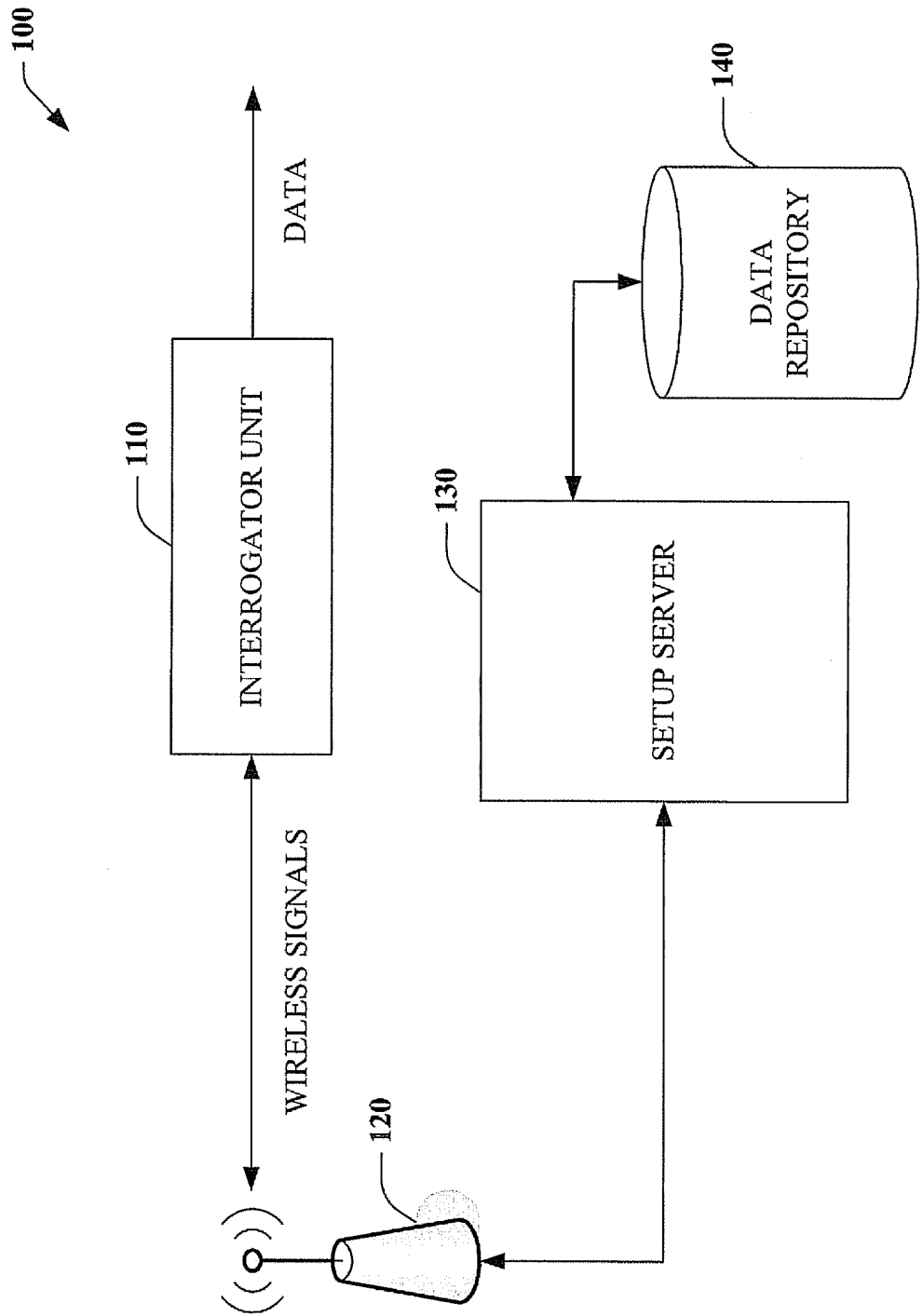
FIG. 1 is a high-level block diagram of a system that provides network identity and time zone functionality for multimode portable/mobile devices.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

FIG. 1 is a high-level block diagram of a system 100 that provides network identity and time zone functionality for multimode portable/mobile devices. The system 100 includes an interrogator unit 110 that can receive and transmit wireless signals to/from a wireless access point 120. The interrogator unit 110 can be a constituent part of, or can be included within, a portable/mobile multimode (e.g., capable of supporting multiple air interface technologies such as GPRS, WLAN, GSM, CDMA, iDEN, etc.) device such as a cell phone, smart phone, Personal Digital Assistant (PDA), a handheld computing device, notebook computer, and the like. Additionally and/or alternatively, the interrogator unit 110, rather than merely forming a constituent part of, or being included within the portable/mobile multimode device, can itself comprise the portable/mobile multimode device in its entirety.

As depicted in FIG. 1, the interrogator unit 110 is in wireless communication with a wireless access point 120. The wireless access point 120 can be a device that connects wireless communication devices, such as interrogator unit 110, together to form a wireless network. The wireless access point 120, in addition to connecting wireless communication devices to constitute a wireless network, is itself usually connected to a wired network, and thus can form an intermediary or gateway between a wired network and a wireless network. Moreover, several wireless access points 120 can be linked together to form a larger network that can facilitate roaming between the several wireless access points 120.

The wireless access point 120 as illustrated in FIG. 1 can be in communication with a setup server 130. The setup server 130 can be in wired or wireless communication with wireless access point 120, though typically communication between the setup server 130 and wireless access point 120 will be effectuated through wired means, such as via DSL, ADSL, VDSL, and other broadband propagation modalities. The setup server 130, possibly in conjunction with an associated data repository 140, provides setup information necessary to configure the interrogator unit 110 to join the wireless network to which the wireless access point 120 and the setup server 130 form an integral part. Additionally, the setup server 130 can also furnish the wireless access point 120 with appropriate setup information wherein such information is stored in and/or retrieved from a data repository 140.

The interrogator unit 110 having received the necessary configuration information from the wireless access point 120 and/or setup server 130 can utilize such information to appropriately propagate time zone, local time and network identity of the service provider for further use, for example, the time zone, local time and the network identity can be displayed on an interface associated with the interrogator unit 110.

Figure 2:
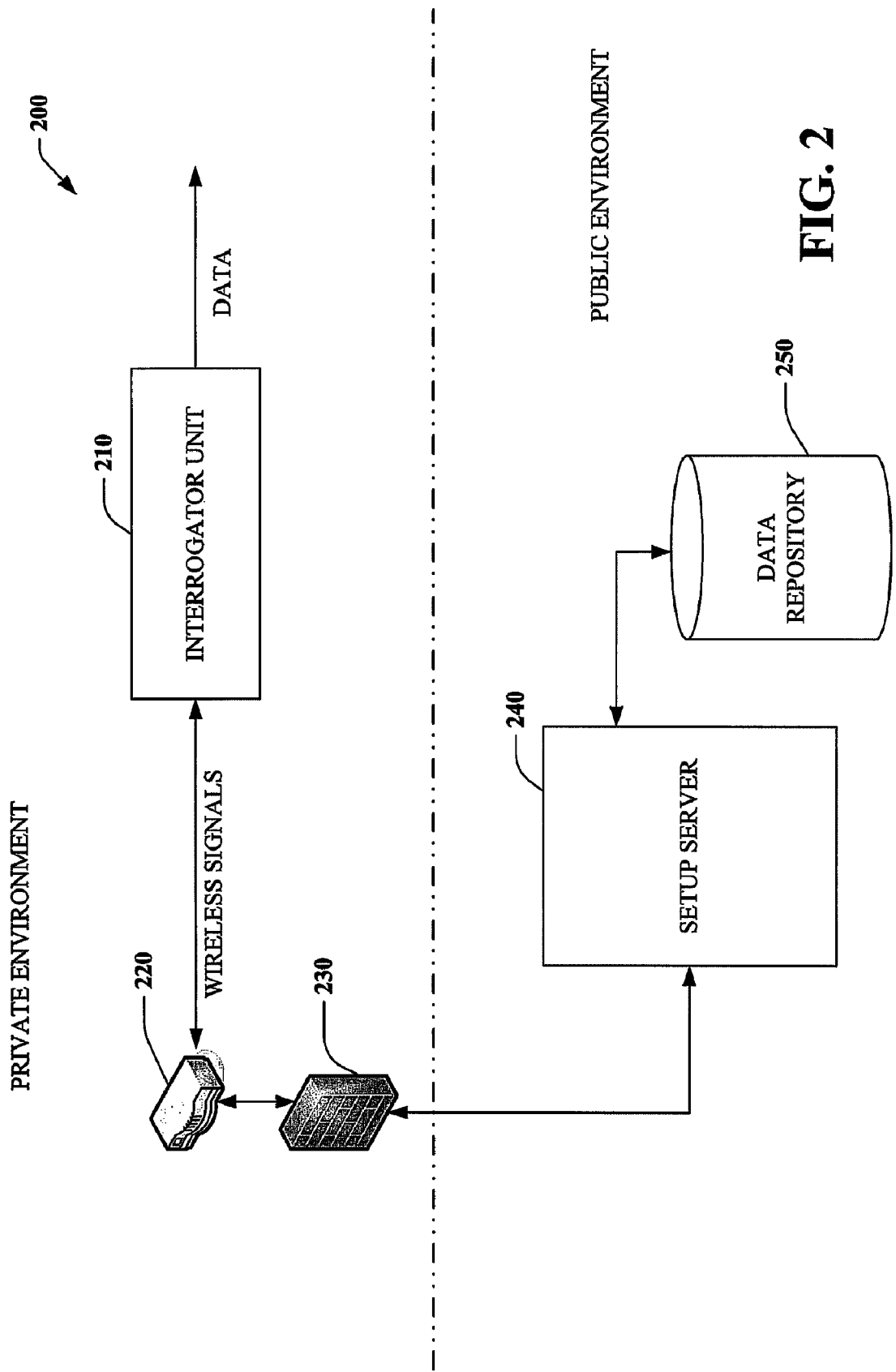
FIG. 2 is another high level block diagram of a system that provides network identity and time zone functionality multimode portable/mobile devices.

FIG. 2 is another high-level block diagram of a system 200 that provides network identity and time zone functionality for multimode portable devices in accordance with another aspect of the claimed subject matter. The system 200 can comprise an interrogator unit 210 that can receive and transmit wireless signals to/from a wireless router 220 that can be in communication with a setup server 240 and associated data repository 250 through a firewall 230. The interrogator unit 210, as noted above, can form a constituent component of, or can be included within, a multimode portable device. In addition and/or in the alternative, the interrogation unit 210, rather than merely forming an included component of the multimode mobile device, can comprise the mobile device in its entirety.

As depicted in FIG. 2, the interrogator unit 210 is in wireless communication with a wireless router 220 that can supply the necessary configuration information to the interrogator unit 210 to form a private network when the interrogator unit 210 is brought within the proximity of the wireless router 220. The wireless router 220 can employ, for example, the embedded logical functionality of one or more of several configuration protocols, such as DHCP, NTP, etc. to provide the necessary configuration information to the interrogation unit 210 and to facilitate its incorporation within the private wireless network over which the wireless router 220 presides.

Figure 3:
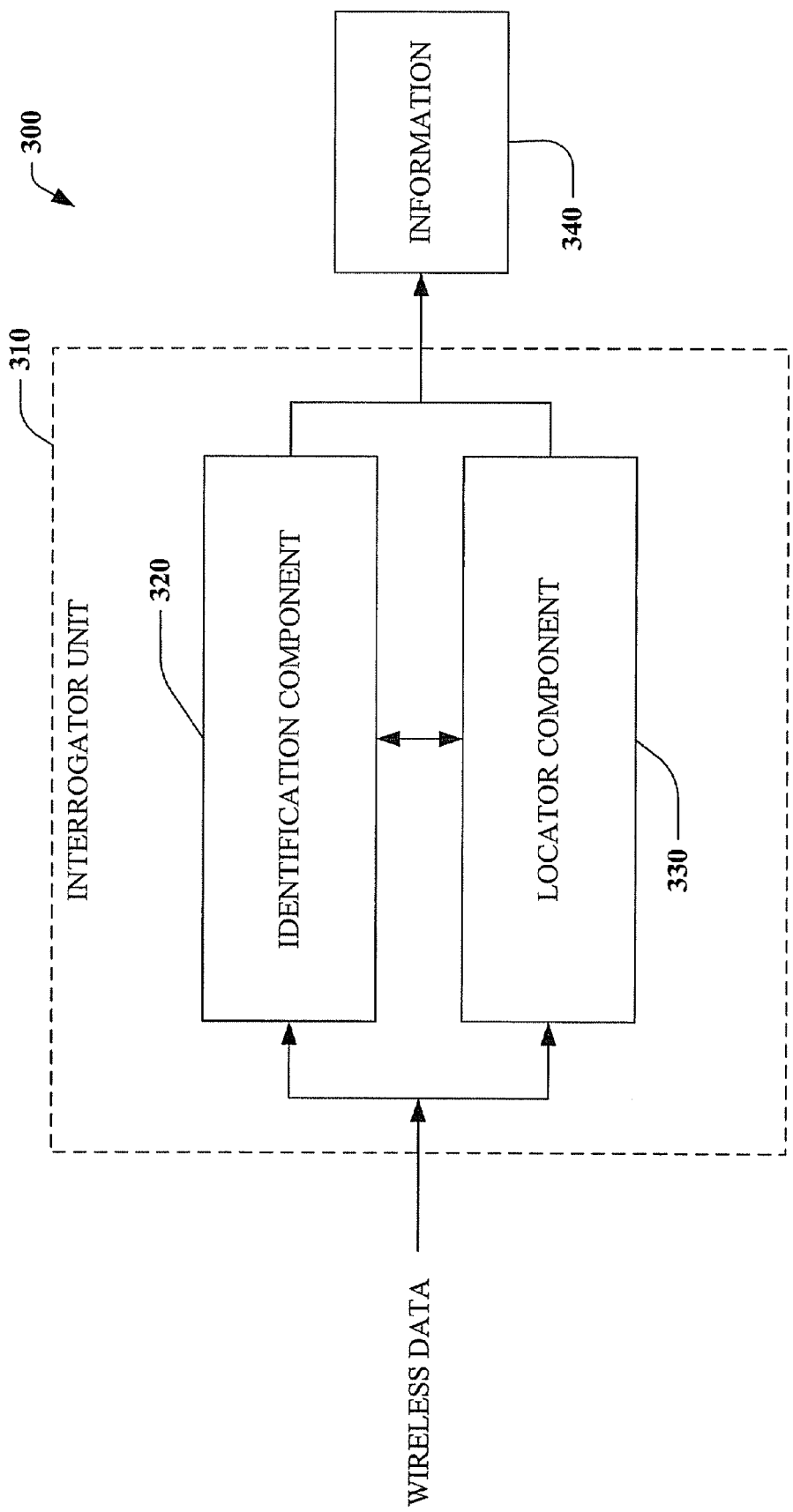
FIG. 3 is a more detailed illustration of a system that provides network identity and time zone functionality for multimode portable devices in accordance with one aspect of the claimed subject matter.

It should be noted that in this configuration and instance that when the wireless router supplies configuration information via the one or more configuration protocols, that the wireless router 220 is in effect setting up a private network/ environment, for example, a private home network, rather than a network to which the general public have unfettered access. Thus, this being the case the wireless router 220 in order to provide external access to networks outside the firewall 230 is also in communication with setup server 240. The setup server 240, possibly in conjunction with the associated data repository 250, provisions the wireless router 220 with appropriate configuration information so that the wireless router 220 and the setup server 240 can form at public network/environment. FIG. 3 depicts a more detailed illustration of a system 300 that provides network identity and time zone functionality for multimode portable devices in accordance with one aspect of the claimed subject matter. The system 300 includes an interrogator component 310 that can be included within a multimode mobile/portable device such as a cell phone, laptop computer, tablet computer, personal digital assistance (PDA), hand held computer, and the like. The interrogation unit 310 can comprise an identification component 320 that ascertains the current identity (or network name) of the service provider supplying the wireless signal, and a locator component 330 that determines the current location within which the interrogation unit 310 resides.

The identification component 320 and the locator component 330 are supplied with information by way of a wireless access point or a wireless router (FIGS. 1 and 2). The information so provided by the wireless access point or wireless router can be by way of one or more of several configuration protocols the functionality of which can be embedded or encapsulated within the wireless access point or wireless router. Alternatively and/or additionally, the identification component 320 and the locator component 340 can be provisioned with information by way of a setup server (FIGS. 1 and 2) that can have executing thereon services (e.g., DHCP, NTP, SIP, etc.) that can supply information needed to determine network identity, time zone, and local time information, in which case the wireless access point or wireless router maintain their traditional roles of being pass through devices wherein data packets are forwarded across from a first network to a second network.

The information can be supplied to the identification component 320 and locator component 330 in the following manner. When the interrogator unit 310 that can include identification component 320 and locator component 330, is powered on in the vicinity, or is brought within the proximity, of a wireless access point or router, the interrogator unit 310 can listen for an advertisement that can be periodically broadcast by a wireless access point and/or a wireless router. The wireless access point and/or wireless router typically broadcasts as the advertisement its service set identifier (SSID). Thus, the interrogator unit 310 listens for a service set identifier (SSID) that it recognizes. Recognition can take the form of ascertaining whether or not the service set identifier (SSID)

matches a service set identifier (SSID) previously provisioned and/or programmed into the interrogator unit 310. Once the interrogator unit 310 has determined that there is a correspondence between a received service set identifier (SSID) and a service set identifier (SSID) previously provisioned, the interrogator unit 310 determines whether encryption (e.g., WEP, WPA, WPA2, and the like) is necessary to associate with the wireless access point and/or wireless router, and if so, the interrogator unit 310 can supply this information to the wireless access point and/or wireless router. Alternatively, if the received and recognized service set identifier (SSID) indicates that no encryption is necessary to associate with the wireless access point, the interrogator unit 310 can automatically associate with the wireless access point and/or wireless router.

It should be noted that for the purposes of ease of explication, and that while the claimed subject matter as set forth herein has been described in terms, or utilization, of a service set identifier (SSID), that the subject matter as claimed is not so limited. As will be appreciated by those of commensurate skill other equivalent modalities can be employed to effectuate the aims and purposes of the claimed subject matter and as such each and every one of these equivalent modalities, alone and/or in combination, will fall within the purview of the subject matter as claimed.

The service set identifier (SSID) information is a code attached to all packets on a wireless network to identify each packet as part of that network. The code consists of a maximum of 32 alpha numeric characters (e.g., 0-32 octets). All wireless devices attempting to communicate with each other must share the same service set identifier (SSID). Apart from identifying each packet, the service set identifier (SSID) also serves to uniquely identify a group of wireless network devices used in a given service set. It should be noted that the service set identifier (SSID) can be employed in two contexts, first, in the context of a basic service set (BSS) which can be considered the fundamental building block of a wireless local area network (WLAN) such that the coverage of a single wireless access point comprises the basic service set (BSS). In this instance the single wireless access point acts as a master to control the stations within the basic service set (BSS), and each basic service set (BSS) is identified by a SSID which it typically the 48 bit media access control (MAC) address of the access point and/or station. In the second context, the service set identifier (SSID) can be utilized wherein groups of basic service sets (BSSs) are connected with one another via a wired and/or wireless backbone network to form an integrated local area network such that the single service set identifier (SSID) describes integrated entirety as a whole. The service set identifier (SSID) by convention is commonly set to the name of the network operator, such as a company name. Thus, the identification component 320 can utilize the fact that the service set identifier (SSID) is commonly set and/or mapped to the name of the network operator to generate appropriate humanly readable identification information at 340.

The locator component 330, like the identification component 320, receives configuration data via a wireless access point or wireless router. The configuration data can include an IP address, subnet mask, DNS server and default gateway information, that can be used to both uniquely identify the interrogator unit 310 on the wireless network over which the wireless access point has dominion. The configuration data can be received from both the wireless access point itself, or alternatively, the configuration data can be obtained from the setup server. Typically, the configuration data is generated by a Dynamic Host Configuration Protocol (DHCP) service that can execute on the wireless access point and/or on a setup server. While a Dynamic Host Configuration Protocol (DHCP) service conventionally just assigns a client with an IP address, subnet mask, DNS server and default gateway information, other data, such as timezone information, can also be supplied through one or more options and/or sub-options associated with DHCP. The information supplied by the DHCP service via the DHCP option and/or sub-option can include time zone information and can be in the form of an offset in seconds from Coordinated Universal Time (UTC). For example, UTC-5 hours would indicate a time zone representative of Eastern Standard Time (EST) and cities located therein such as Toronto, Canada and Boston, Massachusetts. Similarly, UTC+1 hour would indicate a time zone indicative of Central European Time (CET) and cities such as Paris, France and Berlin, Germany. Thus, the locator component 330 can extract from the DHCP options and sub-options general location information, e.g., the time zone in which the interrogator unit 310 currently resides, and thereafter, can utilize this information to ascertain the appropriate local time that the interrogator unit 310 can subsequently utilize at 340.

Figure 4:
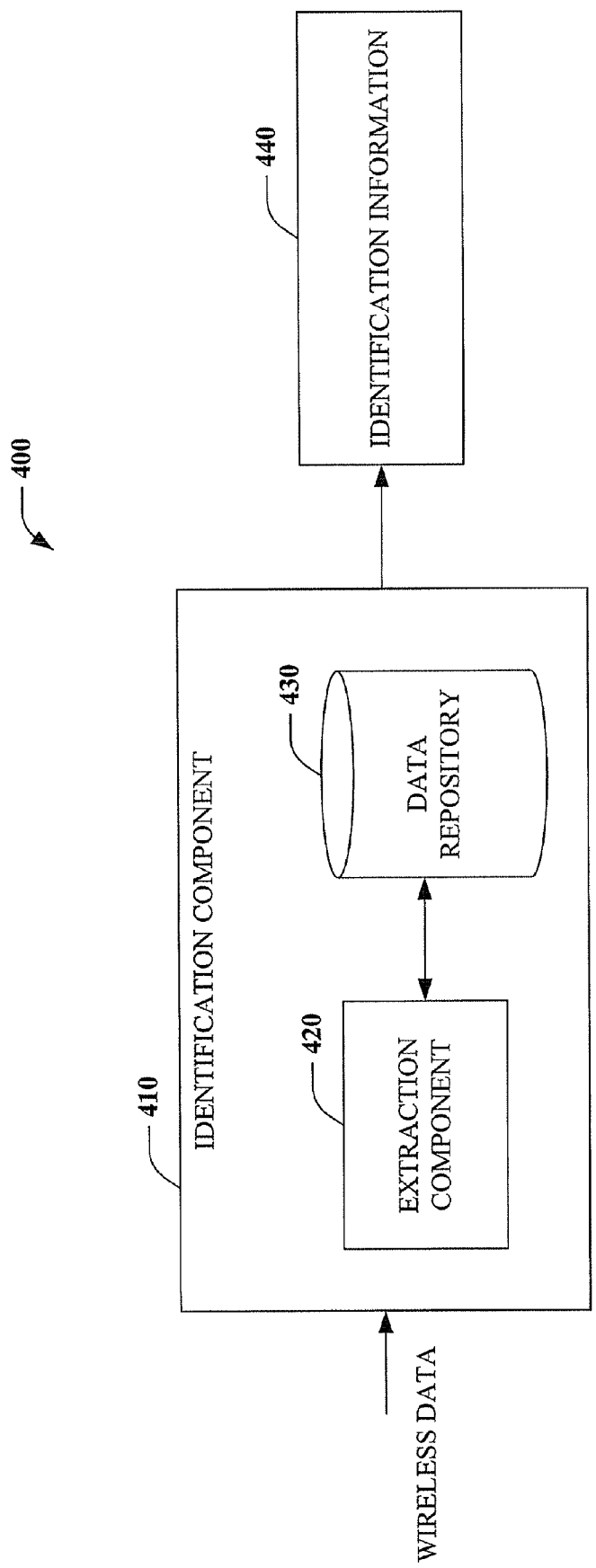
FIG. 4 is a more detailed illustration of an identification component that provides network identity information for subsequent utilization by a multimode portable/mobile device.

FIG. 4 is a more detailed illustration 400 of an identification component 410 that includes an extraction component 420 and an associated data repository 430. The identification component 410 receives data by way of a wireless access point. The data that is received relates to a service set identifier (SSID) that can be a 32 character alphanumeric code that identifies the network operator. The service set identifier (SSID) is data that is appended to all packets that are transmitted and received in a wireless network, and uniquely identifies each packet as belonging to that network. Since all wireless devices that attempt to communicate with each other must share the same service set identifier (SSID) the extractor component 420 can identify the appropriate fields in the service set identifier (SSID) to obtain the network operator associated with the service set identifier (SSID). It should be noted however that there may be instances where the service set identifier (SSID) is merely numeric characters, or a combination of numeric, humanly imperceivable characters and humanly recognisable characters. Where the service set identifier (SSID) does not comprise a humanly recognizable name or is different than the operator name that should be displayed to the user, the extraction component 420 can access a lookup table located in the associated data repository 430 to determine a suitable transliteration to apply in order to manifest a humanly recognizable network operator name, e.g., a company name. Once the identification component 410 has ascertained from the service set identifier (SSID) an operator identification, this identification information can be output for subsequent utilization at 440.

Alternatively and/or additionally, where the extractor component 420 is unable to locate a correspondence between a service set identifier (SSID) and an item in the lookup table located in the associated data repository 430, the extractor component 420 can query a backend server (e.g., setup server) to ascertain the correspondence provided network connectivity is available to query the backend server.

Figure 5:
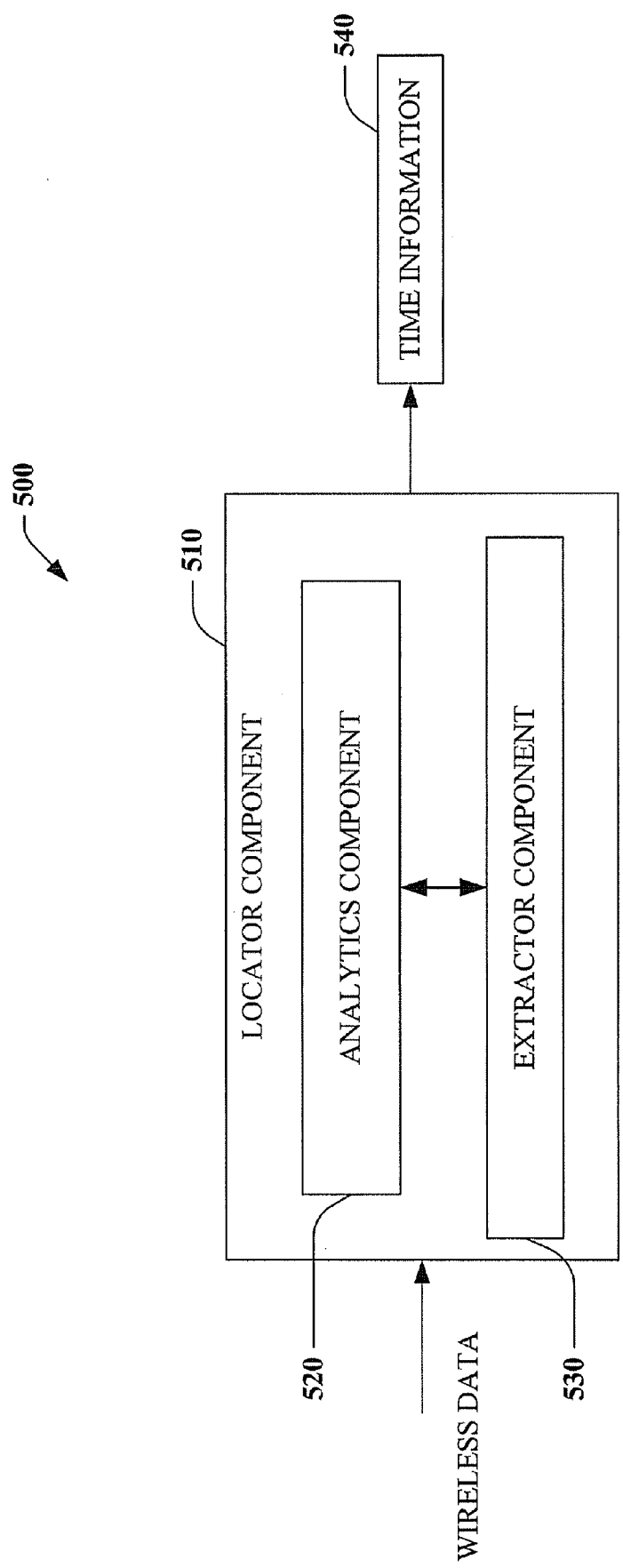
FIG. 5 is a detailed illustration of a locator component that includes ascertains time zone and local time information for subsequent use by a multimode portable/mobile device.

FIG. 5 is a more detailed illustration 500 of a locator component 510 that includes an analytics component 520 and an extractor component 530. The locator component 510 receives data, for example, from a wireless access point, and determines through utilization of the analytics component 520 and extractor component 530 generates time information 540 which can be subsequently utilized, for example, displayed on an interface associated with a portable/mobile multimode device. The data that is received by the locator component 510 can be data supplied by a server running one or more configuration protocol, such as Dynamic Host Configuration Protocol (DHCP), Session Initiation Protocol (SIP), Network Time Protocol (NTP), Extensible Authentication Protocol (EAP), etc.

The Dynamic Host Configuration Protocol (DHCP) is a client-server networking protocol. A DHCP server provides configuration parameters specific to the DHCP client that requests information required by the client to participate on an IP network. The DHCP protocol automates the assignment of IP addresses, subnet masks, default routers, and other IP parameters. Assignment of the IP addresses and associated parameters usually occurs when a DHCP client boots up or regains connectivity to the network. The DHCP client typically sends out a query requesting response from a DHCP server on a network. The DHCP server then replies to the client with an assigned IP address, subnet mask, DNS server and default gateway information. Additionally, the DHCP server can also supply time zone information that can be in the form of an offset in seconds from Coordinated Universal Time (UTC). Thus, where the analytics component 520 determines that the data being received is DHCP information, the analytics component 520 can communicate with an extractor component 530 that can then extract the appropriate time fields (e.g., time zone) from the received data. The extractor component 530 can then convey this extracted information to the analysis component 520 which can then determine the appropriate information necessary to determine the local time. The local time can then be output as time information 540.

The Session Initiation Protocol (SIP) is a protocol for initiating, modifying and terminating interactive user sessions that involve multimedia elements such as video, voice, instant messaging, online games, and virtual reality. While SIP is primarily used in setting up and tearing down voice and video calls, the protocol can also be used in any application where session initiation is a requirement. It should be noted however that unlike DHCP that provides time information at bootup or at the time of dispatching an IP address, SIP can provide timing information whenever a SIP session is initiated. Thus if the SIP protocol is extended it can provide a facility to provide time information. Thus, SIP provides a facility to carry timing information during the initiation of voice and/or video calls. Consequently, the analytics component 520 can detect whether setup information is being delivered via SIP, and upon such detection, the analytics component 520 can indicate to the extractor component 530 that the protocol being utilized to set up the multimode portable device is SIP, and as such that the extractor component 530 can scan the incoming stream of data to detect data associated with time zone. Once the extractor component 530 has located the time zone information, it can convey this information to the analytics component 520 for further processing. The analytics component 520 can use the time zone information that is passed to it by the extractor component 530 to generate the local time. The local time and the time zone indicated in the received SIP data can then be out put as time information 540.

The Network Time Protocol (NTP) is a protocol that can be utilized to synchronize the clock on a device (e.g., setup server, wireless access point, multimode terminal), and is particularly resistant to the effects of variable latency. The Network Time Protocol (NTP) employs a hierarchical system of clock strata, wherein each stratum defines a distance from a reference clock and an associated accuracy. Stratum 0 of the clock strata can include devices such as GPS clocks or other radio clocks.

Generally stratum 0 devices are not attached to a network but are instead connected to computers (e.g., via an RS-232 connection using a pulse per second signal). Computers that are connected to stratum 0 devices are generally known as stratum 1 servers or time servers and can act as servers for timing requests from stratum 2 servers via NTP. Thus, for example the setup server and/or the wireless access point can periodically access one of these stratum 1 and/or 2 servers to synchronize its clock with that of one of the established time servers and thereafter communicate this synchronized time to multimode portable device. Consequently, the analytics component 520 can periodically be provisioned with timing information from the setup server and/or wireless access point. Additionally, the setup server and/or the wireless access point can provide location information that can be utilized by the analytics component 520 to ascertain and generate the local time in which the multimode portable device is currently residing. The correct local time can then be output as time information 540.

Similarly, the Extensible Authentication Protocol (EAP) is an authentication protocol that can be employed in wireless networks and point-to-point connections, and more typically is utilized in wireless LAN networks. The Extensible Authentication Protocol (EAP) can typically be thought of as an authentication framework rather than a specific authentication mechanism that provides common functions and a negotiation of a desired authentication mechanism. Such mechanisms can be called EAP methods and can include, for example, EAP-MDS, EAP-OTP, EAP-GTC, EAP-TLS, EAP-SIM, EAP-AKA, PEAP, LEAP, and various other vendor specific EAP methods. Conventionally, the Extensible Authentication Protocol (EAP) is invoked by an 802.1X device, to provide a secure authentication mechanism and to negotiate a secure Pair-wise Master Key (PMK). It is possible to extend EAP messages to provide location or time zone information to the terminal as part of the authentication process. Thus, the analytics component 520 can indicate to the extractor component 530 that the Extensible Authentication Protocol (EAP) protocol is being utilized. The extractor component 530 can subsequently scan the incoming stream to detect data associated with time and can convey this time data to the analytics component 520 for further processing. The analytics component 520 can thereafter utilize the time data to ascertain the local time and output this information as time information 540.

Figure 6:
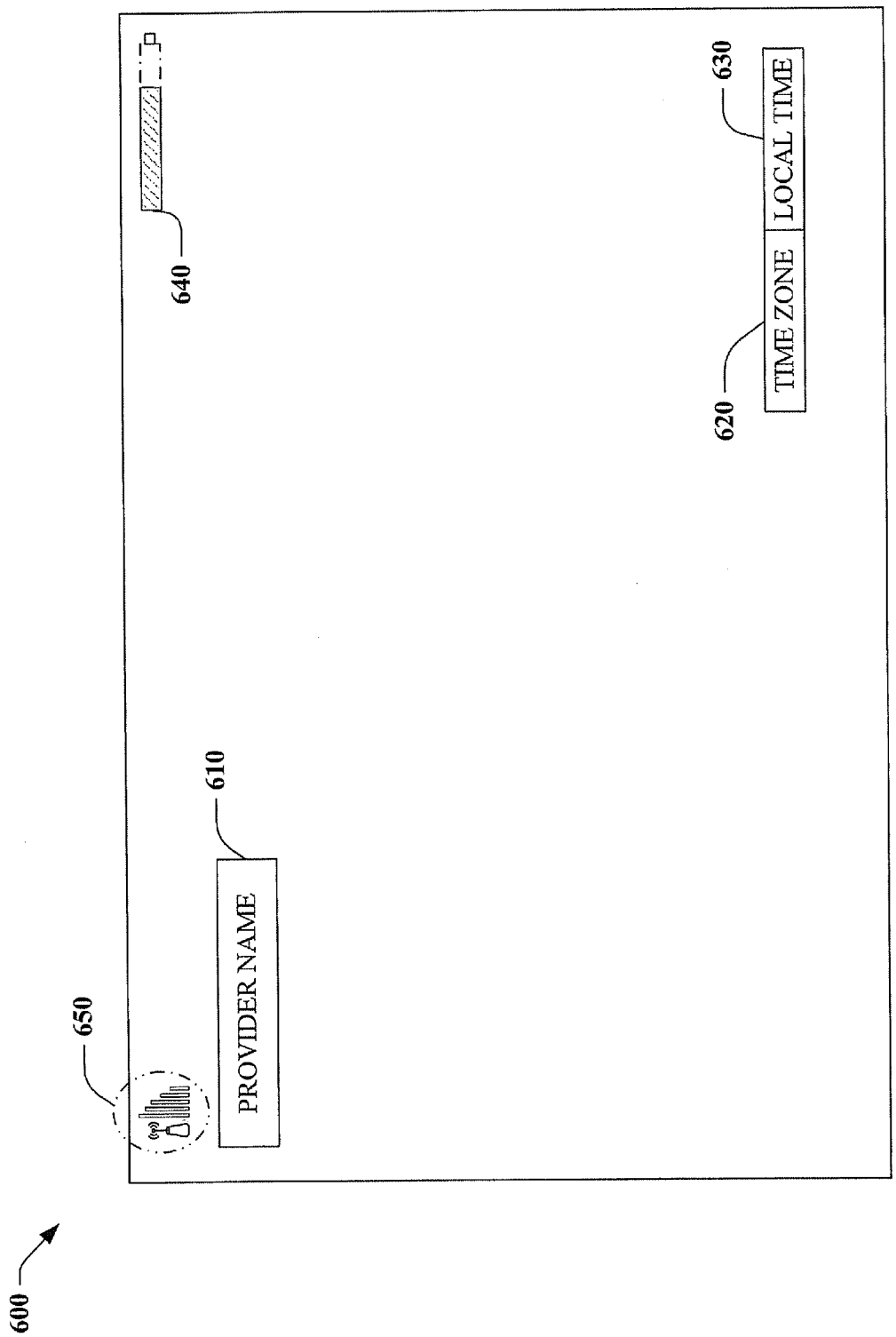
FIG. 6 illustrates an example graphical interface that displays the network identity and time zone information on a multimode portable/mobile device.

FIG. 6 illustrates an example interface 600 that displays the network identity and time zone information on a multimode portable/mobile device. As stated supra, when a multimode mobile/portable device is brought within the ambit of a wireless access point, the wireless access point possibly in conjunction with a setup server can provide network information to configure the multimode portable/mobile device to be included in the network. The network information so provided can include the provider name, the time zone and the local time. Thus interface 600 that can be associated with the multimode portable/mobile device can display a provider name 610 that is derived by an interrogator unit from WLAN SSID information that is broadcast by the wireless access point. Additionally, the interface 600 can display time zone information 620 and local time 630. The time zone information 620 by convention can be ascertained as an offset from some global reference denoted as the Prime Meridian, such as Greenwich Mean Time (GMT), Coordinated Universal Time (UTC), etc. Moreover, given that the appropriate time zone information has been ascertained the local time can also be determined and displayed at 630. In addition, indications as to battery life 640, and connectivity to a network 650 can also be displayed on the exemplary interface 600. It should be noted that while the provider name 610, time zone information 620, and local time 630 have been illustrated as residing in the respective top left and bottom right corners of the exemplary display 600, the claimed subject matter is not so limited. As will be apparent to those conversant with the technology, placement of the provider name 610, time zone information 620, and local time 630 can be made in any location of the exemplary display and as such will fall within the purview of the claimed subject matter.

Figure 7:
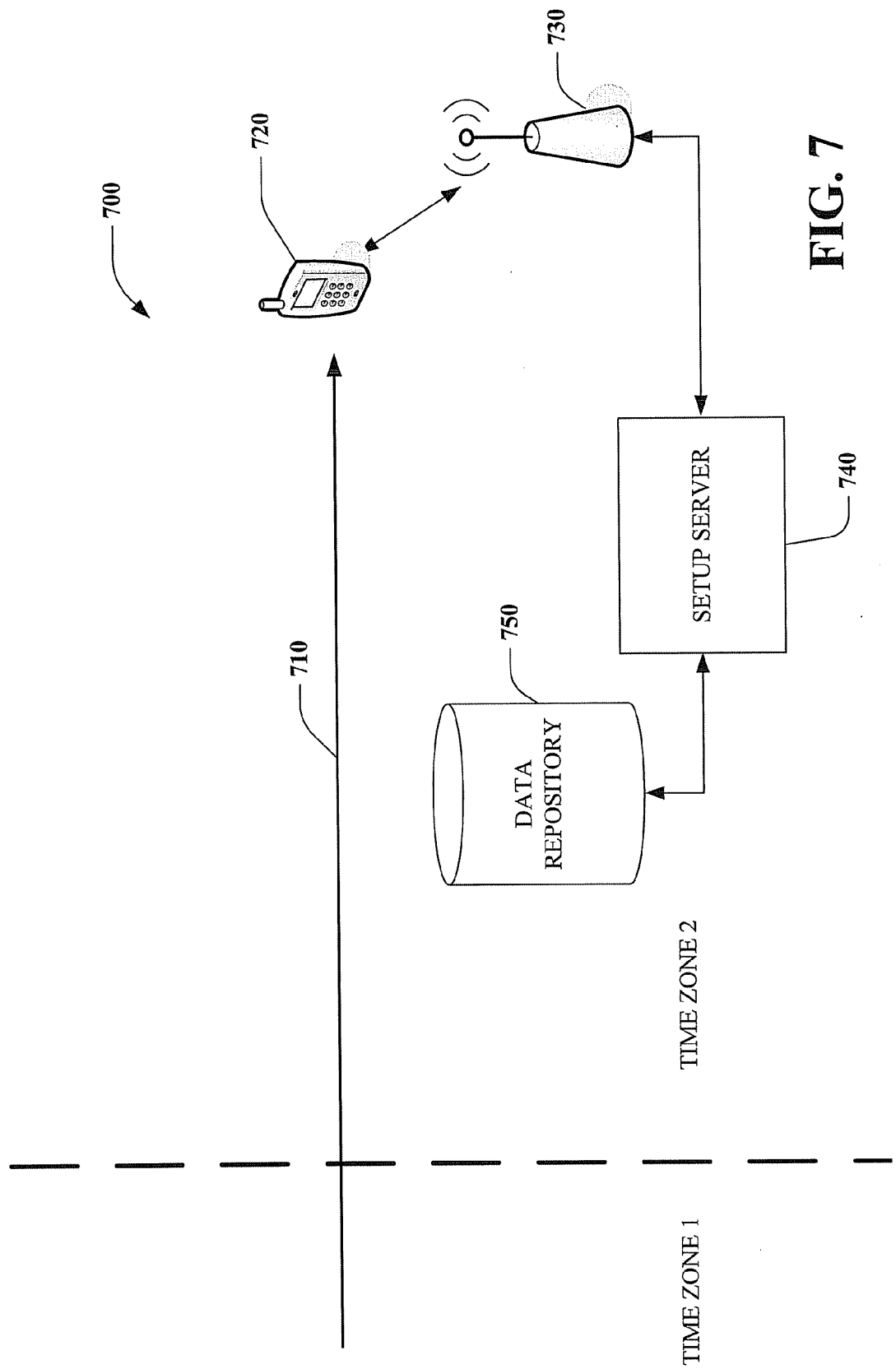
FIG. 7 is a depiction of a multimode mobile device traversing between two time zones.

FIG. 7 is a depiction 700 of a multimode mobile device traversing between two time zones. As indicated by the arrow 710, the depiction illustrates a multimode Smart phone 720 traveling between two time zones, e.g., Time Zone 1 and Time Zone 2. For the purposes of illustration and not limitation it is to be assumed that Time Zone 1 and Time Zone 2 are noncontiguous (e.g., Time Zone 1 can represent San Francisco, and Time Zone 2 can represent Toronto, Canada), and that the Smart phone 720 is powered off for the duration of the traversal between these two time zones. Additionally, it is further assumed for the purpose of explication and not limitation that the Smart phone 720 while in use in Time Zone 1 was operating within a GSM network, and that when Smart phone 720 arrives in Time Zone 2 will operate within a non-3GPP network, such as a Wireless Local Area Network (WLAN) utilizing, for example, the suite of IEEE 802.11 networking protocols. Thus, upon arrival in Time Zone 2 the Smart phone 720 having last been configured in a GSM network will have information as to provider identity, time zone and local time relating to that relate to information that was set in Time Zone 1. Typically, in such instances where a multimode mobile/portable device is relocated from a GSM network to a WLAN utilizing the IEEE 802.11 based networking protocols, the settings provided by the GSM network as to provider identity, time zone and location time information are not updated by the WLAN environment. However, through utilization of the claimed subject matter, the service provider identity, time zone and local time information can be set on the multimode mobile device. Thus, when the multimode Smart phone 720 is powered up in time zone 2, the Smart phone 720 can listen for an appropriate service set identifier (SSID) broadcast by one or more wireless access point 730. Based on the service set identifier (SSID), the Smart phone 720 can provide identification and authentication information that can be supplied by a subscriber identification module (SIM) that is included with the Smart phone 720. The subscriber authentication and identification information supplied by the SIM can either be utilized by the wireless access point 730 to supply appropriate information (e.g., IP address, time zone information, local time information, network access identifier (NAI), etc.) to the Smart phone, or alternatively, the wireless access point 730 can forward the subscriber information to a setup server 740 and associated data repository 750, whereupon the setup server 740 can supply the appropriate information to the Smart phone 720 via the wireless access point 730. In this manner the Smart phone 720 can be provisioned with information relating to the appropriate service provider name, the correct time zone within which the Smart phone currently resides and the local time determined, so that each of these pieces of information can be appropriately displayed on the Smart phone 720, thus overriding the settings previously set while the Smart phone 720 was in time zone 1 and under the influence of the GSM network.

Figure 8:
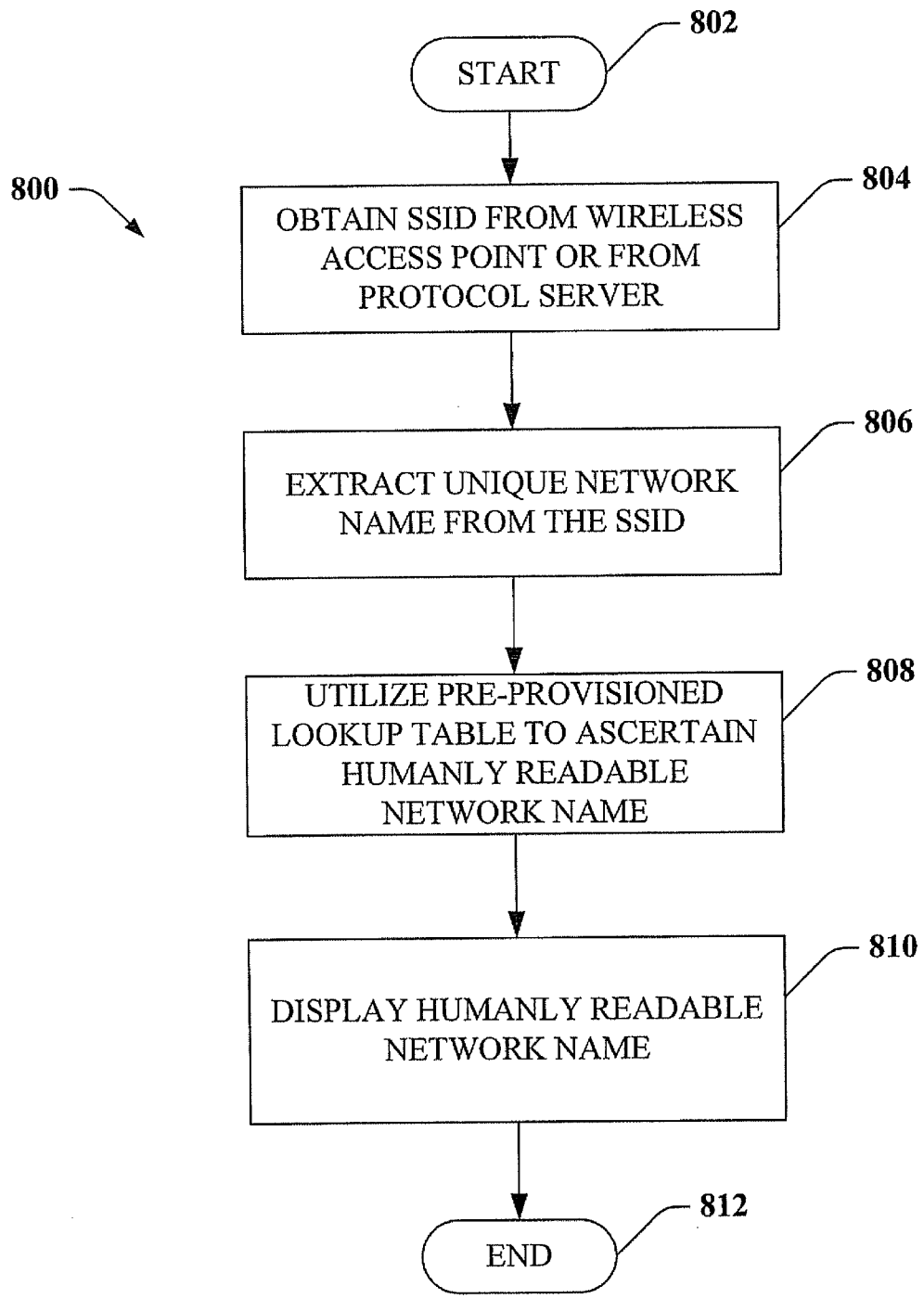
FIG. 8 is a representative flow diagram of a methodology for obtaining and displaying a humanly readable network name.
Figure 9:
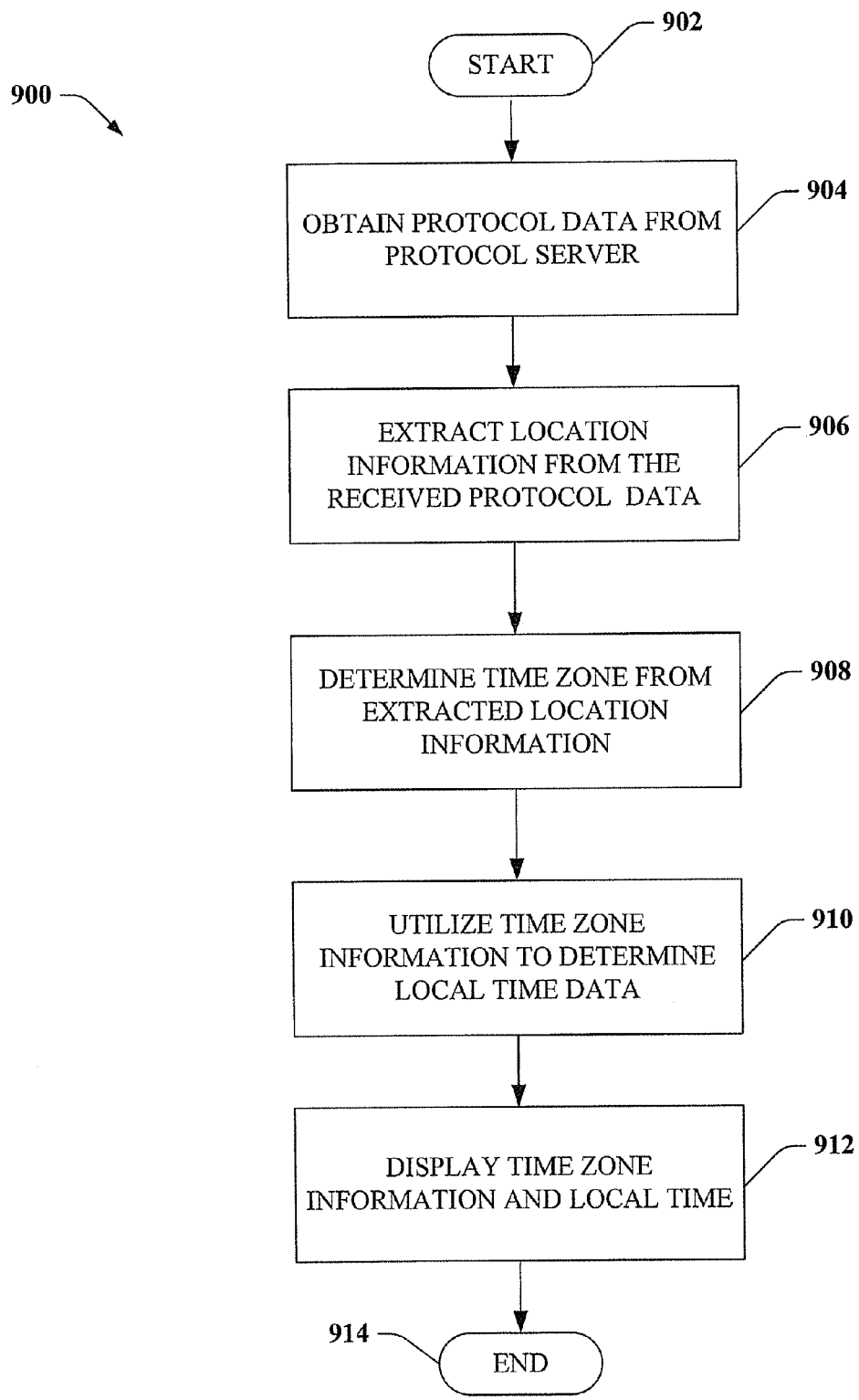
FIG. 9 is a representative flow diagram of a methodology for obtaining and displaying time zone information and local time.

Referring to FIGS. 8 and 9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning to FIG. 8, a methodology 800 for obtaining and displaying a humanly readable network name is illustrated. The methodology 800 starts at 802, and proceeds to 804 whereupon SSID is obtained from a wireless access point or from a protocol server. The SSID may be obtained when a multimode mobile device is powered up in the vicinity of a wireless access point to which the multimode mobile device is authorized to gain access to. At 806 the unique network name is extracted from the SSID and at 808 the extracted network name is utilized to locate within a pre-provisioned lookup table a humanly readable network name. At 810 the humanly readable network name that has been obtained from the pre-provisioned lookup table is displayed on an interface associated with the multimode mobile device at which point the methodology terminates at 812.

With reference to FIG. 9, depicted therein is a methodology 900 for obtaining and displaying time zone information and local time. The methodology 900 commences at 902, and immediately proceeds to 904 where protocol (e.g., DHCP, NTP, SIP, EAP, etc.) data from a protocol server is received. At 906, depending upon the protocol and implementation pertinent location information can be extracted from the received protocol data. Other protocols and implementations however can proceed directly to step 910 or to step 912. At 908, based on the location information that has been extracted from the received protocol data, a time zone is determined. Such a time zone determination can involve utilizing one or more pre-provisioned look up tables, or the determination can include computing the appropriate time zone based on the UTC offset supplied by the received protocol data. At 910 the time zone determined at 908 is employed to determine the correct local time for subsequent display or for further utilization by a multimode portable device. At 912 the ascertained time zone information and the generated local time is displayed on an interface associated with the multimode portable device, at which point the methodology terminates at 916.

Figure 10:
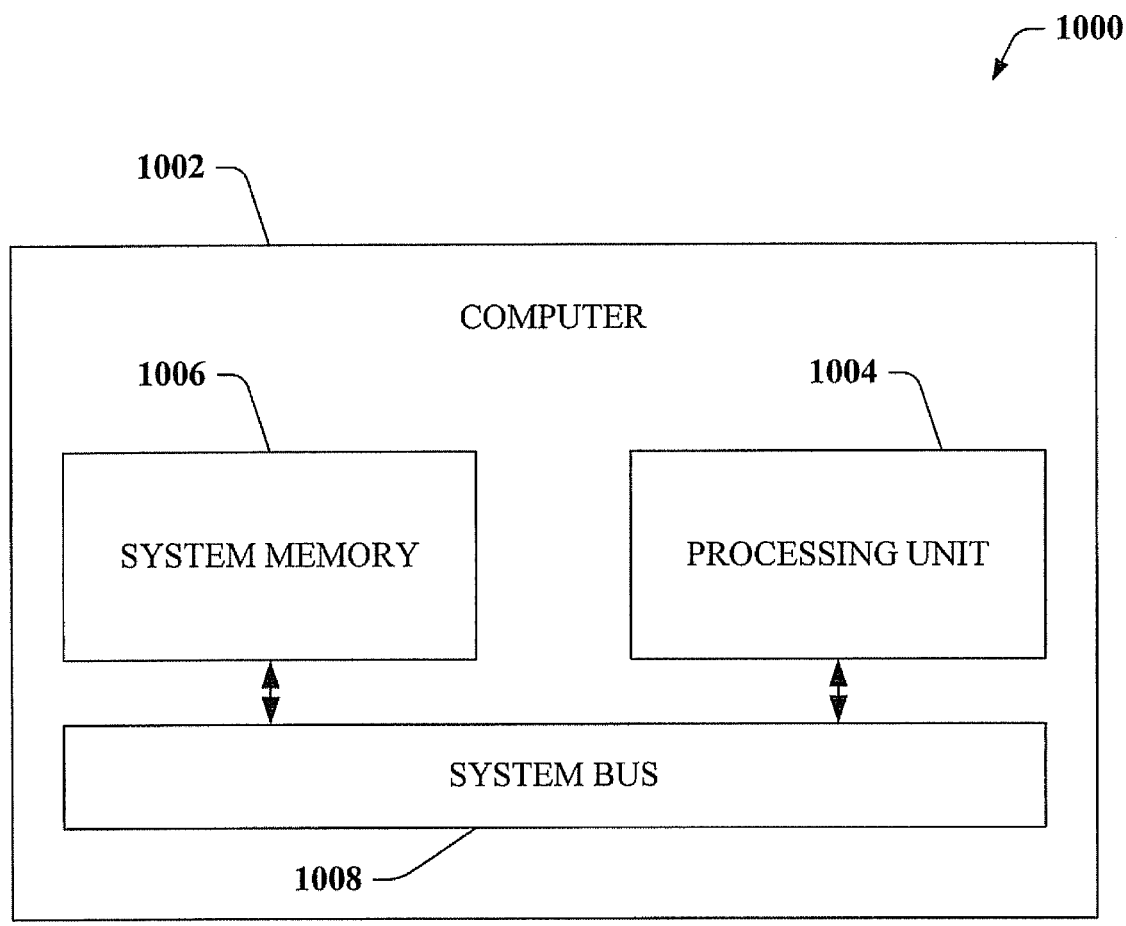
FIG. 10 is an example computing environment that can be employed in connection with various aspects described herein.

Referring now to FIG. 10, there is illustrated a block diagram of a computer operable to provide network identity and time zone information for display on an interface associated with a multimode portable device. While shown through use of a computer or computing components, it is understood that the claimed subject matter may be implemented as a method, apparatus, or article of manufacture using standard programming and/or engineering techniques to produce software, firmware, hardware, or any combination thereof to control a computing device, such as a mobile handset, to implement the disclosed subject matter. The term "article of manufacture" as used herein is intended to encompass a computer program accessible from any computer-readable device. For example, computer readable media can include but is not limited to magnetic storage devices (e.g., hard disk, floppy disk, magnetic strips . . . ), optical disks (e.g., compact disk (CD), digital versatile disk (DVD) . . .), smart cards, SIM cards, and flash memory devices (e.g., card, stick, key drive . . .). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

In order to provide additional context for various aspects of the claimed subject matter, FIG. 10 and the following discussion are intended to provide a brief, general description of a suitable computing environment 1000 in which the various aspects described herein can be implemented. While the description above is in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors, such a single core processor, a multi-core processor, or any other suitable arrangement of processors.

The system bus 1008 can be any of several types of bus structure that may further interconnect to a memory bus (with or without a memory controller), a peripheral bus, and a local bus using any of a variety of commercially available bus architectures. The system memory 1006 can include read-only memory (ROM), random access memory (RAM), high-speed RAM (such as static RAM), EPROM, EEPROM, and/or the like. Additionally or alternatively, the computer 1002 can include a hard disk drive, upon which program instructions, data, and the like can be retained. Moreover, removable data storage can be associated with the computer 1002. Hard disk drives, removable media, etc. can be communicatively coupled to the processing unit 1004 by way of the system bus 1008.

The system memory 1006 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 1002 through one or more wired/wireless input devices, such as a keyboard, pointing and clicking mechanism, pressure sensitive screen, microphone, joystick, stylus pen, etc. A monitor or other type of interface can also be connected to the system bus 1008.

The computer 1002 may operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 1002 can connect to other devices/networks by way of antenna, port, network interface adaptor, wireless access point, modem, and/or the like.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
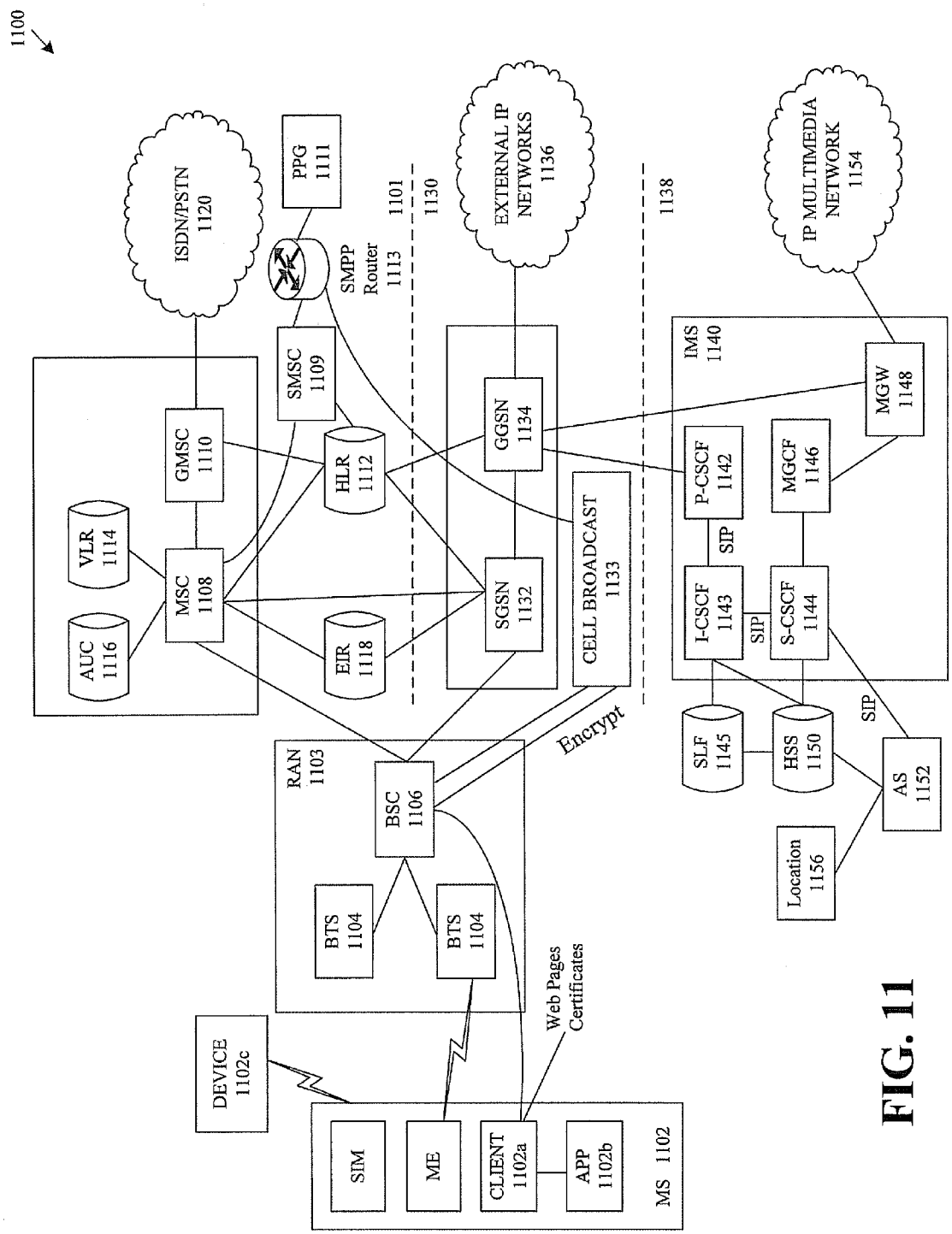
FIG. 11 is an example networking environment.

Now turning to FIG. 11, such figure depicts a GSM/GPRS/IP multimedia network architecture 1100 that includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1102 includes an embedded client 1102a that receives and processes messages received by the MS 1102. The embedded client 1102a may be implemented in JAVA and is discuss more fully below.

The embedded client 1102a communicates with an application 1102b that provides services and/or information to an end user. One example of the application may be navigation software that provides near real-time traffic information that is received via the embedded client 1102a to the end user. The navigation software may provide road conditions, suggest alternate routes, etc. based on the location of the MS 1102. Those of ordinary skill in the art understand that there are many different methods and systems of locating an MS 1102.

Alternatively, the MS 1102 and a device 1102c may be enabled to communicate via a short-range wireless communication link, such as BLUETOOTH. For example, a BLUETOOTH SIM Access Profile may be provided in an automobile (e.g., device 1102c) that communicates with the SIM in the MS 1102 to enable the automobile's communications system to pull information from the MS 1102. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 1102c. There may be an endless number of devices 1102c that use the SIM within the MS 1102 to provide services, information, data, audio, video, etc. to end users.

The BTS 1104 is physical equipment, such as a radio tower, that enables a radio interface to communicate with the MS. Each BTS may serve more than one MS. The BSC 1106 manages radio resources, including the BTS. The BSC may be connected to several BTSs. The BSC and BTS components, in combination, are generally referred to as a base station (BSS) or radio access network (RAN) 1103.

The GSM core network 1101 also includes a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 performs a switching function for the network. The MSC also performs other functions, such as registration, authentication, location updating, handovers, and call routing. The GMSC 1110 provides a gateway between the GSM network and other networks, such as an Integrated Services Digital Network (ISDN) or Public Switched Telephone Networks (PSTNs) 1120. In other words, the GMSC 1110 provides interworking functionality with external networks.

The HLR 1112 is a database or component(s) that comprises administrative information regarding each subscriber registered in a corresponding GSM network. The HLR 1112 also includes the current location of each MS. The VLR 1114 is a database or component(s) that contains selected administrative information from the HLR 1112. The VLR contains information necessary for call control and provision of subscribed services for each MS currently located in a geographical area controlled by the VLR. The HLR 1112 and the VLR 1114, together with the MSC 1108, provide the call routing and roaming capabilities of GSM. The AuC 1116 provides the parameters needed for authentication and encryption functions. Such parameters allow verification of a subscriber's identity. The EIR 1118 stores security-sensitive information about the mobile equipment.

A Short Message Service Center (SMSC) 1109 allows one-to-one Short Message Service (SMS) messages to be sent to/from the MS 1102. A Push Proxy Gateway (PPG) 1111 is used to "push" (e.g., send without a synchronous request) content to the MS 1102. The PPG 1111 acts as a proxy between wired and wireless networks to facilitate pushing of data to the MS 1102. A Short Message Peer to Peer (SMPP) protocol router 1113 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1102 sends a location update including its current location information to the MSC/VLR, via the BTS 1104 and the BSC 1106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1130 is logically implemented on the GSM core network architecture by introducing two packet-switching network nodes, a serving GPRS support node (SGSN) 1132, a cell broadcast and a Gateway GPRS support node (GGSN) 1134. The SGSN 1132 is at the same hierarchical level as the MSC 1108 in the GSM network. The SGSN controls the connection between the GPRS network and the MS 1102. The SGSN also keeps track of individual MS's locations and security functions and access controls.

A Cell Broadcast Center (CBC) 1133 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1134 provides a gateway between the GPRS network and a public packet network (PDN) or other IP networks 1136. That is, the GGSN provides interworking functionality with external networks, and sets up a logical link to the MS through the SGSN. When packet-switched data leaves the GPRS network, it is transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS. the SGSN, arc the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1130 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while received data and vise versa.

The IP multimedia network 1138 was introduced with 3GPP Release 5, and includes an IP multimedia subsystem (IMS) 1140 to provide rich multimedia services to end users. A representative set of the network entities within the IMS 1140 are a call/session control function (CSCF), a media gateway control function (MGCF) 1146, a media gateway (MGW) 1148, and a master subscriber database, called a home subscriber server (HSS) 1150. The HSS 1150 may be common to the GSM network 1101, the GPRS network 1130 as well as the IP multimedia network 1138.

The IP multimedia system 1140 is built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 forwards session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

The I-CSCF 1143 forms an entrance to a home network and hides the inner topology of the home network from other networks and provides flexibility for selecting an S-CSCF. The I-CSCF 1143 may contact a subscriber location function (SLF) 1145 to determine which HSS 1150 to use for the particular subscriber, if multiple HSS's 1150 are present. The S-CSCF 1144 performs the session control services for the MS 1102. This includes routing originating sessions to external networks and routing terminating sessions to visited networks. The S-CSCF 1144 also decides whether an application server (AS) 1152 is required to receive information on an incoming SIP session request to ensure appropriate service handling. This decision is based on information received from the HSS 1150 (or other sources, such as an application server 1152). The AS 1152 also communicates to a location server 1156 (e.g., a Gateway Mobile Location Center (GMLC)) that provides a position (e.g., latitude/longitude coordinates) of the MS 1102.

The HSS 1150 contains a subscriber profile and keeps track of which core network node is currently handling the subscriber. It also supports subscriber authentication and authorization functions (AAA). In networks with more than one HSS 1150, a subscriber location function provides information on the HSS 1150 that contains the profile of a given subscriber.

The MGCF 1146 provides interworking functionality between SIP session control signaling from the IMS 1140 and ISUP/BICC call control signaling from the external GSTN networks (not shown). It also controls the media gateway (MGW) 1148 that provides user-plane interworking functionality (e.g., converting between AMR- and PCM-coded voice). The MGW 1148 also communicates with other IP multimedia networks 1154.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for ascertaining and displaying time zone information and a local time, comprising:
   receiving protocol data from a setup server and a multimode mobile device, via a private network, substantially when the multimode mobile device transitions from a mobile wireless environment to the private network;
   extracting location information from the protocol data;
   extracting network identification information from the protocol data;
   generating a network name based on the network identification information;
   determining a time zone based on the location information;
   generating the local time based on the time zone; and
   displaying the local time and the network name on an interface associated with the multimode mobile device.

2. The method of claim 1, wherein the receiving comprises obtaining the protocol data from a Dynamic Host Configuration Protocol (DHCP) service.

3. The method of claim 1, wherein the receiving comprises obtaining the protocol data from a Network Time Protocol (NTP) service.

4. The method of claim 2, wherein the obtaining the first protocol data from the DHCP service includes receiving time zone information in the form of an offset in seconds from Coordinated Universal Time (UTC).

5. The method of claim 1, wherein the receiving comprises obtaining the protocol data from a Session Initiation Protocol (SIP) service.

6. The method of claim 1, wherein the receiving comprises obtaining the protocol data from an Extensible Authentication Protocol (EAP) service.

7. The method of claim 1, wherein the receiving comprises obtaining the first protocol data from a SIP service including a facility to carry time zone information during the initiation of a session.

8. The method of claim 1, wherein the receiving comprises obtaining the first protocol data from an Extensible Authentication Protocol (EAP) service which provides location or time zone information as part of the authentication process.

9. A method for providing a multimode mobile device with a local time and a network identification, comprising:
    receiving first protocol data and second protocol data from a private network substantially when the multimode mobile device transitions from a mobile wireless environment to the private network;
    extracting the network identification from the first protocol data substantially when the multimode mobile device transitions from a mobile wireless environment to the private network environment;
    determining the local time from the second protocol data substantially when the multimode mobile device transitions from the mobile wireless environment to the private network environment; and
    transmitting the network identification and the local time to the multimode mobile device.

10. The method of claim 9, wherein the receiving the first protocol data further comprises, receiving a network identifier comprising a service set identification (SSID) that uniquely identifies at least one of a basic service set (BSS) or an extended service set (ESS).

11. The method of claim 9, wherein the receiving further comprises, receiving the second protocol data from at least one of a Dynamic Host Configuration Protocol (DHCP) service, a Session Initiation Protocol (SIP) service, an Extensible Authentication Protocol (EAP) service, or a Network Time Protocol (NTP) service.

12. The method of claim 9, wherein the receiving further comprises, receiving the second protocol data from at least one of a wireless access point, a protocol server, a wireless router, or the multimode device.

13. The method of claim 9, wherein the determining further comprises, determining a current time zone.

14. The method of claim 9, wherein the receiving further comprises, receiving the second protocol data from a Dynamic Host Configuration Protocol (DHCP) service, the DHCP service including time zone information in the form of an offset in seconds from Coordinated Universal Time (UTC).

15. The method of claim 9, wherein the receiving further comprises, receiving the second protocol data from a Session Initiation Protocol (SIP) service, the SIP service including a facility to carry time zone information during the initiation of a session.

16. The method of claim 9, wherein the receiving further comprises, receiving the second protocol data from an Extensible Authentication Protocol (EAP) service which provides location or time zone information as part of the authentication process.

17. The method of claim 9, further comprising displaying the network identification and the local time on a display of the multimode mobile device.

18. At least one tangible computer readable medium comprising computer executable instructions which, in response to execution by a computer, perform a method, comprising:
    receiving protocol data from a private network substantially when a multimode mobile device transitions from a mobile wireless environment to the private network;
    extracting a network identification from the protocol data;
    determining a time zone from the protocol data;
    determining a local time, at least in part from the time zone; and
    displaying the network identification and the local time on the multimode mobile device.

19. The at least one tangible computer readable medium of claim 17, comprising computer executable instructions which, in response to execution by a computer, perform a method, wherein the receiving protocol data includes receiving at least one of Dynamic Host Configuration Protocol (DHCP) data, Session Initiation Protocol (SIP) data, Extensible Authentication Protocol (EAP) data, or Network Time Protocol (NTP) data.

20. The at least one tangible computer readable medium of claim 17, comprising computer executable instructions which, in response to execution by a computer, perform a method, wherein the receiving protocol data comprises, receiving a network identifier comprising a service set identification (SSID) that uniquely identifies at least one of a basic service set (BSS) or an extended service set (ESS).

* * * * *